United States Patent Office 3,371,032
Patented Feb. 27, 1968

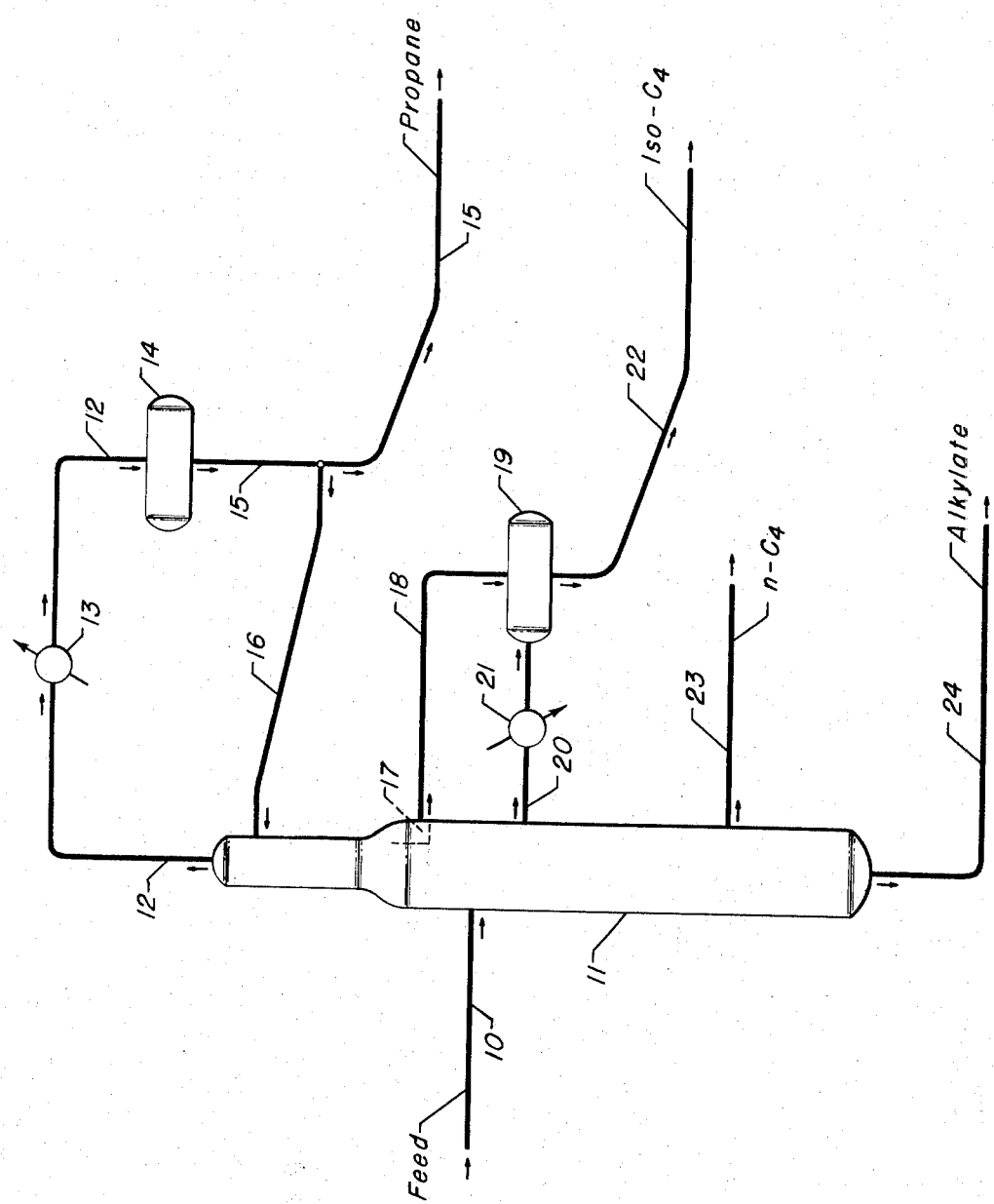

3,371,032
FRACTIONATION OF ALKYLATION EFFLUENT
Paul A. Witt, Oak Park, and James E. Gantt, Elmwood Park, Ill., assignors to Universal Oil Products Company, Des Plaines, Ill., a corporation of Delaware
Filed Nov. 14, 1966, Ser. No. 594,131
5 Claims. (Cl. 208—351)

This invention relates to an improved method for fractionation. It particularly relates to a method for separating the hydrocarbon effluent from an isoparaffin-olefin alkylation reaction zone. It specifically relates to a method for separating a hydrocarbon feed mixture containing $C_3$ hydrocarbons, isobutane, n-butane, and alkylate.

It is well known in the prior art that catalytic alkylation using a catalyst such as hydrofluoric acid or sulfuric acid, has become an important chemical tool for preparing alkylated hydrocarbons and derivations thereof. The commercial and industrial demand for these products is exemplified by the demand for isoparaffins and alkyl-substituted benzenes of gasoline boiling range and the demand for alkyl-substituted aromatic hydrocarbons suitable for conversion to surfactants, e.g., detergents, wetting agents, etc. The prior art processes of alkylation, generally, are effected by contacting an isoparaffin hydrocarbon feed stock with an olefin hydrocarbon in the presence of a catalyst such as hydrofluoric acid or sulfuric acid in a typical reaction vessel for conducting chemical reactions.

The catalytic alkylation process to which the present invention is applicable generally consists of a process in which a mixture of hydrocarbons containing isoparaffins such as isobutane, isopentane and the like, and olefins such as propylenes, butenes, isobutenes and the like, are mixed intimately in the presence of a strong acid catalyst at generally room temperatures or lower for sufficient time to complete the reaction. The effluent from the reaction zone contains saturated isoparaffins of higher molecular weight boiling point than the isoparaffin in the original feed mixture. As is known by the prior art, these higher molecular weight reaction products are commonly called "alkylate." Isobutane has been used almost exclusively because of its reactivity and availability to produce the high quality alkylate product. In similar manner among the olefins, butenes have been used almost exclusively although to a considerable extent mixtures of propylenes and butenes have been used as the feed stock. Propylene and the pentenes and even higher boiling olefinic feed stocks can be used according to their availability.

As is typical in most commercial chemical plants, the reaction between the isobutane, for example, and the olefin is not a complete chemical reaction. Accordingly there is an excess of the isoparaffin hydrocarbon remaining in the effluent from the reaction zone. In addition, there is a considerable amount of $C_3$ hydrocarbon, such as propane, remaining in the reaction product mixture. Therefore, it is desirable to recover and reuse the isoparaffin reactant in as high yield as possible, and to recover the $C_3$ hydrocarbons which have passed through the reaction zone in as high yield as possible for other uses, such as fuel.

In practice, there have been numerous process schemes advanced by the prior art for accomplishing the alkylation reaction and the subsequent recovery of the isoparaffin hydrocarbon for reuse in the reaction. Generally, the prior art has taken the hydrocarbon portion of the reaction zone effluent into what is commonly called a deisobutanizer tower wherein an isobutane-rich stream is recovered as an overhead fraction and the desired alkylate product is removed from the bottom of the tower. The difficulty with this practice is that the feed stream from normal refinery operations to an alkylation plant contains not only the desired reactants, for example, isobutane and butylene, but also contains $C_2$ to $C_5$ hydrocarbons in various amounts. Specifically, if propylene is used as an olefin for reaction, there is always a considerable amount of propane in such a feed mixture. Therefore, the overhead stream from the deisobutanizer tower in such an alkylation plant not only contains isobutane, but also contains at least the $C_3$ hydrocarbons which were present in the feed.

In order to make an economical separation of the $C_3$ and $C_4$ hydrocarbons in a deisobutanizer tower, the tower, of necessity, must be of considerable height and also must contain expensive condensing and receiving equipment for the overhead streams. Typically, the prior art deisobutanizer tower is operated such that the desired isobutane fraction is condensed and a vapor fraction containing the $C_3$ hydrocarbons is removed from the overhead receiver for processing in a depropanizer tower. Thus, the prior art processes generally use a fractionation train consisting at least of a deisobutanizer tower and a depropanizer tower for separating the hydrocarbon phase from an alkylation zone effluent.

Accordingly, it is an object of the present invention to provide an improved fractionation scheme.

It is another object of this invention to provide an improved method for recovering the isoparaffin reactant for reuse in the catalytic alkylation reaction zone in a more facile and economical manner.

It is a particular object of the invention to provide a fractionation method for the separation of an isobutane enriched stream from the effluent of an isoparaffin-olefin alkylation reaction zone in a more expeditious manner than has heretofore been possible.

It is a specific object of this invention to provide an improved method for separating a hydrocarbon feed mixture containing $C_3$ hydrocarbons, isobutane, n-butane and alkylate by fractionation means.

As has been previously noted, the feed stock to a conventional alkylation reaction preferably consists of isobutane and butylene. However, as will be more fully developed herein, the present invention incompasses a feed mixture containing $C_3$ and $C_4$ olefins as well as the $C_2$ to $C_5$ paraffins. Specifically, however, the present invention has unique adaptability for an alkylation reaction utilizing solely $C_3$'s as the olefin stream and $C_4$'s as the isoparaffin stream. In similar manner, the invention contemplates the use of any suitable catalytic material in addition to hydrofluoric acid, such as sulfuric acid, mixtures of sulfuric and phosphoric acid, and certain complexes of aluminum chloride and sulfuric acid.

According to the present invention, there is provided a method for separating a hydrocarbon feed mixture containing $C_3$ hydrocarbons, isobutane, n-butane and alkylate by fractionation means comprising: (a) introducing said feed mixture into a single distillation column maintained under distillation conditions at an intermediate locus thereof; (b) withdrawing an overhead stream comprising hydrocarbons having less than 4 carbon atoms per molecule; (c) withdrawing an upper sidecut liquid stream comprising isobutane at a locus above said intermediate locus; (d) withdrawing a vapor stream comprising isobutane at a locus below said intermediate locus; (e) removing a lower sidecut fraction comprising n-butane; (f) removing a bottom stream comprising alkylate containing sufficient n-butane to produce a predetermined vapor pressure alkylate product; and, (g) returning a portion of said overhead stream to said column as reflux thereon.

Another embodiment of the present invention includes distillation conditions of an overhead temperature from 110° F. to 130° F., an overhead pressure from 230 p.s.i.g.

to 260 p.s.i.g., a bottoms temperature from 440° F. to 500° F., and a bottoms pressure from 250 p.s.i.g. to 290 p.s.i.g.

An illustrative embodiment of the invention includes the processing of a feed mixture which is the hydrocarbon phase from the effluent of an isoparaffin-olefin alkylation reaction zone with emphasis upon an isobutane-propylene alkylation reaction.

It is to be noted from the description of the various embodiments of the present invention that the invention is based on the concept that a single distillation column can be used to separate the effluent from an alkylation reaction zone. In contrast, the prior art has generally utilized at least two distillation towers to effectuate the same separation. Therefore, the present invention has provided economies of operation and capital investment over these prior art schemes which use two or more towers.

The objects and advantages of this invention will be more clearly understood from the detailed description presented hereinbelow with reference to the appended drawing which is a diagrammatic representation of apparatus for practicing one embodiment of the invention.

The description of the present invention will be limited to the processing scheme for handling the effluent from a conventional isobutane-propylene alkylation reaction zone, although the scope of the invention is not necessarily to be limited thereto. The effluent is prepared by means known to those skilled in the art and generally comprises the steps of comingling an olefin-containing feed stock with an isoparaffin-containing feed stock, and passing the mixture into a conventional alkylation reactor vessel. An isobutane-enriched hydrocarbon stream is also added to the reaction zone in order that the isoparaffin to olefin ratio in the presence of the catalyst is at the proper level. Means for removing the heat of reaction from the reactor vessel must be provided and the contact time in the reactor is maintained for a period sufficient to intimately mix and contact the feed mixture with the catalyst so the alkylation reaction can occur. The total effluent from the reaction zone is removed and passed into a separation means whereby the acid phase is separated from the hydrocarbon phase, generally by settling. The acid is, preferably, returned to the process in admixture with fresh acid, as needed, and the hydrocarbon phase is further processed now in accordance with the present invention.

Referring now to the appended drawing, a hydrocarbon feed mixture containing $C_3$ hydrocarbons (propane), isobutane, n-butane, and alkylate is passed via line 10 into distillation column 11. The feed material in line 10 has preferably been heated to a suitable temperature for example, from 170° F. to 180° F., by indirect heat exchange means such as low pressure steam. As the feed material passes into single distillation column 11, the lighter hydrocarbons comprising propane and isobutane are passed upwardly through the column. There are sufficient fractionation trays contained in distillation column 11 to effectively separate the various components according to their boiling points. An overhead stream comprising propane is removed from column 11 via line 12 and passed through condenser 13 into accumulator 14. The liquid material in accumulator 14 is removed via line 15 and passed out of the process. The material in line 15 comprises, generally, propane. As needed, a portion of the material removed from separator 14 is passed via line 16 into the upper section of distillation column 11 as reflux therein. It will be noted from the complete description of the present invention that the material in line 16 is the sole reflux means on the tower.

As previously noted, the feed material in line 10 which had been flashed as it entered column 11, comprised vapors of isobutane which passed upwardly into the column. Preferably the column is so constructed that the deck immediately above the feed flash zone is a "total trapout tray," i.e., there is no liquid run-back from the tray above the feed locus. Such a trapout tray is indicated on the diagram as 17. Accordingly, a liquid stream comprising isobutane is removed from column 11 via line 18 and passed into accumulator 19. In similar fashion, the heavier portion of the feed mixture passes down the column and undergoes fractionation by heat input or upwardly rising vapor streams generated by reboiling of the bottoms from the tower by means not shown. Since the fractionation column is generally less than 100% efficient in its separation, there is a considerable amount of isobutane in the heavier material which initially begins to flow down column 11. In order to effectuate maximum recovery of the isobutane and utilize the benefits of the present invention, it is critical that the additional isobutane stream be removed from the column as a vapor at a locus below the feed locus. Therefore, a vapor stream comprising isobutane is removed from column 11 via line 20 at locus below the feed locus. The vapor stream is condensed in condenser 21 and, preferably, is passed into accumulator 19 in admixture with the liquid stream comprising isobutane which had also been removed from the tower via line 18. The total amount of hydrocarbon comprising isobutane is removed from accumulator 19 and passed from the process and, preferably, is recycled to the reaction zone for further reaction.

As mentioned hereinabove, the feed material contains a significant amount of n-butane. It is important of course, that the n-butane be removed during the distillation process in order that suitable vapor pressure control of the desired alkylate product may be achieved. Accordingly, n-butane is removed from column 11 via line 23 in an amount sufficient to control the vapor pressure of the alkylate product which is removed as a bottom stream from fractionation column 11 via line 24 at a predetermined vapor pressure level, e.g. 7 pounds Reid.

The operating conditions embodied by the present invention for satisfactory operation of column 11 include an overhead temperature from 110° F. to 130° F., an overhead pressure from 230 p.s.i.g. to 260 p.s.i.g., a bottoms temperature from 440° F. to 500° F., and a bottoms pressure from 250 p.s.i.g. to 290 p.s.i.g. Preferably, these operating conditions include an overhead temperature from 115° F. to 120° F., with the upper sidecut liquid stream comprising isobutane being withdrawn at a temperature from 180° F. to 190° F., with the vapor side-cut stream comprising isobutane being withdrawn at a temperature from 195° F. to 205° F., with the lower sidecut fraction comprising n-butane being removed, preferably, as vapor at a temperature from 235° F. to 245° F., a bottoms temperature from 475° F. to 485° F., and as previously mentioned, with the feed mixture being introduced into column 11 at a temperature from 170° F. to 180° F.

Conventional alkylation conversion conditions of temperature, pressure, isoparaffin-olefin ratio and hydrogen fluoride-hydrocarbon ratio can be employed advantageously in the reaction zone contemplated herein for preparation of the hydrocarbon phase which is processed in accordance with the present invention. For example, the alkylation of isobutane with propylenes can be carried out at temperatures from 0° F. to 150° F., preferably between 80° F. and 110° F., at pressures sufficiently high to keep the hydrocarbon and catalyst in liquid phase, and at isobutane-propylene ratios between 2:1 and 20:1, preferably between 10:1 and 15:1. Ratios of isobutane to propylene of at least 2:1 are essential since lower ratios tend to cause polymerization of the propylenes with resulting decrease in yield of alkylate product. The ratio of catalyst to hydrocarbon charge can be varied considerably. For example, a volume ratio of 1:1 to 10:1 can be used; preferably, at least 2.1 is used. The acid catalyst charged to the reactors can be substantially anhydrous and can have a titratable acidity as low as 65% by weight, but preferably is maintained between 85% and 95% acidity.

When operating a hydrogen fluoride alkylation unit in the manner hereinabove described, utilizing the process of the present invention, an alkylate product having an end point below 400° F. and research octane (at 3 cc.'s of T.E.L./gal. of alkylate) of at least 105 is obtained, with a hydrogen fluoride catalyst consumption of less than 0.2 pound of catalyst/barrel of alkylate produced. Preferably, the vapor pressure of the alkylate is maintained at a predetermined level, such as 7.0 pounds Reid vapor pressure. Additionally, a significant economy of operation and low capital expense is achieved over the "two-tower" process schemes taught by the prior art.

EXAMPLE

The following example illustrates the practice of the present invention as represented by data taken from commercial scale plant design, with reference to the appended drawing. A feed mixture in line 10 comprising 1,229 mols/hr. of propane, 4,912 mols/hr. of isobutane, 1,185 mols/hr. of n-butane, 15 mols/hr. of isopentane, and 486 mols/hr. of $C_6+$ material is charged into distillation column 11 at a temperature of 175° F. and a pressure of 295 p.s.i.g. Approximately 159 mols/hr. of n-butane is removed as a vapor stream via line 23 at a temperature of 240° F. and a pressure of 265 p.s.i.g. The composition of the material in line 23 comprises 5 mols/hr. of isobutane, 153 mols/hr. of n-butane, 1 mol/hr. of isopentane, and 1 mol/hr. of $C_6+$ material.

The desired alkylate product is removed from the tower via line 24 at a temperature of 435° F. and a pressure of 270 p.s.i.g. The alkylate contains sufficient light hydrocarbons to produce a 7 pound Reid vapor pressure, and composition-wise: 1.2 mols/hr. of isobutane, 51 mols/hr. of n-butane, 9.2 mols/hr. of isopentane, and 442 mols/hr. of $C_6+$ material.

The lower sidecut vapor stream is removed from the tower via line 20 at a temperature of 200° F., a pressure of 225 p.s.i.g., and comprises 40 mols./hr. of propane, 662 mols./hr. of isobutane, 180 mols./hr. of n-butane, and 1 mol./hr. of $C_5+$ material. The upper sidecut fraction comprising liquid isobutane is removed via line 18 at a temperature of 185° F. and a pressure of 225 p.s.i.g., and comprises 640 mols/hr. of propane, 4,240 mols./hr. of isobutane, 80 mols./hr. of n-butane, 5 mols./hr. of isopentane, and 24 mols./hr. of $C_6+$ material.

The overhead stream from column 11 is removed via line 12 at a temperature of 117° F. and a pressure of 240 p.s.i.g. This total overhead vapor stream comprises 6,587 mols./hr. of propane and 99 mols./hr. of isobutane. Thus, it is to be understood that as used herein, the overhead stream from the single distillation column is intended to include minor amounts of other hydrocarbons than $C_3$ hydrocarbons, although the stream for convenience has been designated either as a $C_3$ hydrocarbon stream, or as hydrocarbons having less than 4 carbon atoms per molecule.

The reflux to the column via line 16 is at a temperature of 100° F. and a pressure of 315 p.s.i.g. This reflux stream comprises 6,040 mols./hr. of propane and 91 mols./hr. of isobutane.

It is therefore seen from the description that the present invention provides a method for separating a hydrocarbon feed mixture containing $C_3$ hydrocarbons, isobutane, n-butane, and alkylate by a single fractionation means.

The invention claimed:
1. Method for separating a hydrocarbon feed mixture containing $C_3$ hydrocarbons, iso-butane, n-butane and alkylate by fractionation means comprising:
   (a) introducing said feed mixture into a single distillation column maintained under distillation conditions at an intermediate locus thereof;
   (b) withdrawing an overhead stream comprising hydrocarbons having less than 4 carbon atoms per molecule;
   (c) withdrawing an upper side-cut liquid stream comprising iso-butane at a locus above said intermediate locus;
   (d) withdrawing a vapor stream comprising iso-butane at a locus below said intermediate locus;
   (e) removing a lower side-cut fraction comprising n-butane;
   (f) removing a bottoms stream comprising alkylate containing sufficient n-butane to produce a pre-determined vapor pressure alkylate product; and
   (g) returning a portion of said overhead stream to said column as reflux thereon.
2. Method according to claim 1 wherein said feed mixture comprises the hydrocarbon phase from the effluent of an isoparaffin-olefin alkylation reaction zone.
3. Method according to claim 2 wherein said olefin comprises propylene.
4. Method according to claim 1 wherein said distillation conditions include an overhead temperature from 110° F. to 130° F., an overhead pressure from 230 p.s.i.g. to 260 p.s.i.g., a bottoms temperature from 440° F. to 500° F., and a bottoms pressure from 250 p.s.i.g. to 290 p.s.i.g.
5. Method according to claim 4 wherein said overhead temperature is from 115° F. to 120° F., and upper side-cut liquid stream is withdrawn at a temperature from 180° F. to 190° F., said vapor stream is withdrawn at a temperature from 195° F. to 205° F., said lower side-cut fraction is removed as vapor at a temperature from 235° F. 245° F., said bottoms temperature is introduced at a temperature from 170° F. to 180° F.

References Cited

UNITED STATES PATENTS 2,990,437   6/1961   Berger _____ 208—351

HERBERT LEVINE, *Primary Examiner.*